(12) United States Patent
Corfe et al.

(10) Patent No.: US 10,081,210 B2
(45) Date of Patent: Sep. 25, 2018

(54) MULTI-PASS INK-JET PRINTING METHOD WHEREIN INK IS EXPOSED TO ACTINIC RADIATION IN A SPECIFIC ORDER

(71) Applicant: FujiFilm Speciality Ink Systems Limited, Broadstairs Kent (GB)

(72) Inventors: Lee Corfe, Broadstairs Kent (GB); Mark Pemble, Broadstairs Kent (GB)

(73) Assignee: Fujifilm Speciality Ink Systems Limited (GB)

( * ) Notice: Subject to any disclaimer, the term of this patent is extended or adjusted under 35 U.S.C. 154(b) by 0 days.

(21) Appl. No.: 15/537,563

(22) PCT Filed: Dec. 23, 2015

(86) PCT No.: PCT/GB2015/054156
§ 371 (c)(1),
(2) Date: Jun. 19, 2017

(87) PCT Pub. No.: WO2016/102974
PCT Pub. Date: Jun. 30, 2016

(65) Prior Publication Data
US 2018/0001686 A1 Jan. 4, 2018

(30) Foreign Application Priority Data
Dec. 24, 2014 (GB) ..................... 1423206

(51) Int. Cl.
*B41M 5/00* (2006.01)
*B41M 7/00* (2006.01)
(Continued)

(52) U.S. Cl.
CPC ............ *B41M 5/0023* (2013.01); *B41J 2/475* (2013.01); *B41J 11/002* (2013.01);
(Continued)

(58) Field of Classification Search
CPC ... B41M 5/0023; B41M 7/0081; C09D 11/38; C09D 11/101; C09D 11/322;
(Continued)

(56) References Cited

U.S. PATENT DOCUMENTS 4,105,806 A 8/1978 Watt
4,309,452 A 1/1982 Sachs
(Continued)

FOREIGN PATENT DOCUMENTS

EP  2 161 137  *  8/2009  ............ B41J 25/308
EP  2161137 A1  3/2010
(Continued)

OTHER PUBLICATIONS

International Search Report for corresponding application No. PCT/GB2015/054156 dated Feb. 9, 2016.
Search Report for priority application No. GB1423206.0.

*Primary Examiner* — Henok Legesse
(74) *Attorney, Agent, or Firm* — Wood, Phillips, Katz, Clark & Mortimer

(57) ABSTRACT

The present invention provides a method of multi-pass inkjet printing comprising: (i) providing an inkjet ink comprising a radiation-curable monomer and a photoinitiator; (ii) jetting the ink via a printhead on to a substrate, wherein the ink is applied in multiple passes of the printhead with respect to the substrate, with each pass jetting a portion of ink in a layer on the substrate, with a first layer being jetted directly on to the substrate and subsequent layers being jetted onto the preceding layer, to build an image formed of the multiple layers; and (iii) exposing all of the layers of ink to actinic radiation to cure the ink, wherein the order of jetting the layers and curing is that pairs of layers are applied to the substrate without exposing the first layer of the pair to actinic radiation prior to the second layer of the pair of layers (Continued)

being applied, curing the pair of layers simultaneously by exposing the pair of layers to actinic radiation, and repeating until the image is formed.

12 Claims, 5 Drawing Sheets

(51) Int. Cl.
    *C09D 11/38*     (2014.01)
    *C09D 11/101*     (2014.01)
    *C09D 11/322*     (2014.01)
    *B41J 2/475*     (2006.01)
    *B41J 11/00*     (2006.01)

(52) U.S. Cl.
    CPC ........ *B41J 11/0015* (2013.01); *B41M 5/0011* (2013.01); *B41M 7/0081* (2013.01); *C09D 11/101* (2013.01); *C09D 11/322* (2013.01); *C09D 11/38* (2013.01)

(58) Field of Classification Search
    CPC ....... C09D 11/107; B41J 2/475; B41J 11/002; B41J 11/0015
    See application file for complete search history.

(56) References Cited

U.S. PATENT DOCUMENTS

2004/0227798 A1    11/2004   Nakajima
2013/0233189 A1     9/2013   Wittmann et al.

FOREIGN PATENT DOCUMENTS

| GB | 2448695 A | 10/2008 | | |
|----|-----------|---------|----|----|
| WO | 2009/017477 A1 | 2/2009 | | |
| WO | 2012/110815 A1 | 8/2012 | | |
| WO | WO 2012/110815 | * | 8/2012 | .............. B41M 7/00 |

* cited by examiner

MULTI-PASS INK-JET PRINTING METHOD WHEREIN INK IS EXPOSED TO ACTINIC RADIATION IN A SPECIFIC ORDER

FIELD OF THE INVENTION

This invention relates to a printing ink, and particularly to a method of inkjet printing a radiation-curable ink.

BACKGROUND OF THE INVENTION

In inkjet printing, minute droplets of ink are ejected in a controlled manner from one or more printing heads through narrow nozzles on to a substrate which is moving relative to the printing head(s). The ejected ink forms an image on the substrate. For high-speed printing, the inks must flow rapidly from the printing heads, and, to ensure that this happens, they must have in use a low viscosity, typically 200 mPas or less at 25° C., although in most applications the viscosity should be 50 mPas or less, and often 25 mPas or less. Typically, when ejected through the nozzles, the ink has a viscosity of less than 25 mPas, preferably 5-15 mPas and ideally 10.5 mPas at the jetting temperature which is often elevated to 40-50° C. (the ink might have a much higher viscosity at ambient temperature). The inks must also be resistant to drying or crusting in the reservoirs or nozzles. For these reasons, inkjet inks for application at or near ambient temperatures are commonly formulated to contain a large proportion of a mobile liquid vehicle or solvent such as water or a low-boiling solvent or mixture of solvents.

Another type of inkjet ink contains unsaturated organic compounds, termed monomers and/or oligomers which polymerise by irradiation, commonly with ultraviolet light, in the presence of a photoinitiator. This type of ink has the advantage that it is not necessary to evaporate the liquid phase to dry the print; instead the print is exposed to radiation to cure or harden it, a process which is more rapid than evaporation of solvent at moderate temperatures. In such inkjet inks it is necessary to use monomers possessing a low viscosity.

In inkjet printing, the inkjet printhead moves relative to the substrate from one end of the substrate to another laying down the ink on the substrate as it passes over the substrate. This movement of the printhead relative to the substrate is termed a "single pass" of the inkjet head relative to the substrate. The ink that is applied to the substrate during this single pass may form the whole image or a part of the image. Where the whole image is formed, no further passes of the printhead over the substrate are required and the technique is termed "single-pass" printing. Where only part of the image is formed, further passes of the printhead are required and the technique is termed "multi-pass" printing. Thus, multi-pass mode occurs when not all of the ink required for the complete image on a substrate is applied during one pass of the printhead over the substrate.

In multi-pass printing, the odd and even numbered passes may be in the same or opposite directions. The former is termed "uni-directional" multi-pass printing and the latter is termed "bi-directional" multi-pass printing.

Printers for multi-pass printing typically have a range of flatbed printing platforms which use printheads to deposit ink droplets over a series of print passes to build an image. An example is the Inca Onset S40i, as shown in FIG. 1. In FIG. 1, the following reference numerals apply: printing bed with substrate (1), a first and second UV lamp (2,3), printhead (4), a power map for recording UV dose and intensity value (5) and the printing direction (6).

As shown in FIG. 1, the printheads are configured across the whole width of the print area, and the substrate moves to-and-fro under the printheads. FIG. 1 shows the printhead printing a first layer of ink in a single pass. The left-hand side of the figure shows the substrate on a flatbed prior to a pass and the right-hand side of the figure shows the substrate after a first pass. The substrate will then move back to its original position laying down another layer of ink in a second pass. Optionally the printhead may index (i.e. they shift slightly left or right based on the direction of travel) between passes. A printhead has an array of nozzles, usually a linear array, typically from 128 to 2,056, with 256 nozzles being common. The indexing of the printhead ensures that if any nozzles in the printhead are not firing, the absence of ink on a single given pass is not noticeable in the final image.

As each portion of the total amount of ink is applied to the substrate on each pass of the printhead, the ink is cured by exposure to actinic radiation. The radiation source (typically referred to as a "lamp") may be integral to the printhead or separate, but usually integral. The printhead usually has a leading and a trailing lamp for optimising the cure.

Printers of this type usually have two print modes as standard. A "satin mode" is the highest productivity mode, and the number of print passes is selected based on the quality of image required. There are no additional cure passes associated with this print mode. UV lamps are adjusted to a suitable power to ensure good ink cure and effective substrate heat management. A "gloss mode" is a lower productivity mode and is used when a higher gloss or gamut is required. The lamp is shuttered or the power reduced for all print passes to give a low "pinning" UV dose, which can be varied to achieve the required level of gloss. To achieve full cure, two additional slow high UV hard cure passes are applied to the print. FIG. 2 shows the relationship between colour development and gloss.

In "gloss mode", it is not always possible to achieve good adhesion or productivity. Another method is to employ a time delay between print and cure to allow the ink to flow further before curing (see WO 2012/110815). This often results in poor reproduction of fine text or other print quality issues such as bleeding and mottling.

Another approach has been to formulate inks for slower curing and/or employing inherently glossy raw materials. However, as productivity and performance requirements require faster or higher functionality inks, using faster curing or lower gloss raw materials leads to dot gain reduction and gamut reduction in traditional hard cure "satin print" modes.

There remains a need in the art for widening the ink formulation latitude, whilst still providing high performing inks with acceptable gamut, gloss and print quality.

BRIEF SUMMARY OF THE INVENTION

Accordingly, the present invention provides a method of multi-pass inkjet printing comprising:

(i) providing an inkjet ink comprising a radiation-curable monomer and a photoinitiator;

(ii) jetting the ink via a printhead on to a substrate, wherein the ink is applied in multiple passes of the printhead with respect to the substrate, with each pass jetting a portion of ink in a layer on the substrate, with a first layer being jetted directly on to the substrate and subsequent layers being jetted onto the preceding layer, to build an image formed of the multiple layers; and (iii) exposing all of the layers of ink to actinic radiation to cure the ink, wherein the order of jetting the layers and curing is that pairs of layers are applied to the substrate without exposing the first layer of the pair to actinic radiation prior to the second layer of the pair of layers being applied, curing the pair of layers simultaneously by exposing the pair of layers to actinic radiation, and repeating until the image is formed.

This invention uses a radiation source ("lamp") providing a dose sufficient for full cure which is applied only to every other print pass. In effect one layer is printed without curing and the next layer is applied and then they are cured together. The sequence is thus: wet-on-wet/cure/wet-on-wet/cure/wet-on-wet/etc. This means that every other layer receives a time delay to allow ink to spread, and the resultant print has a higher gloss and gamut than printing in the traditional manner. The benefit of this compared to other traditional methods described to increase gamut and gloss, is that adhesion and print quality can be maintained as a good strength cure is applied to layers throughout the image building process.

BRIEF DESCRIPTION OF THE DRAWINGS

The present invention will now be described with reference to the accompanying drawing, in which.

DETAILED DESCRIPTION OF THE INVENTION

Figure 1:
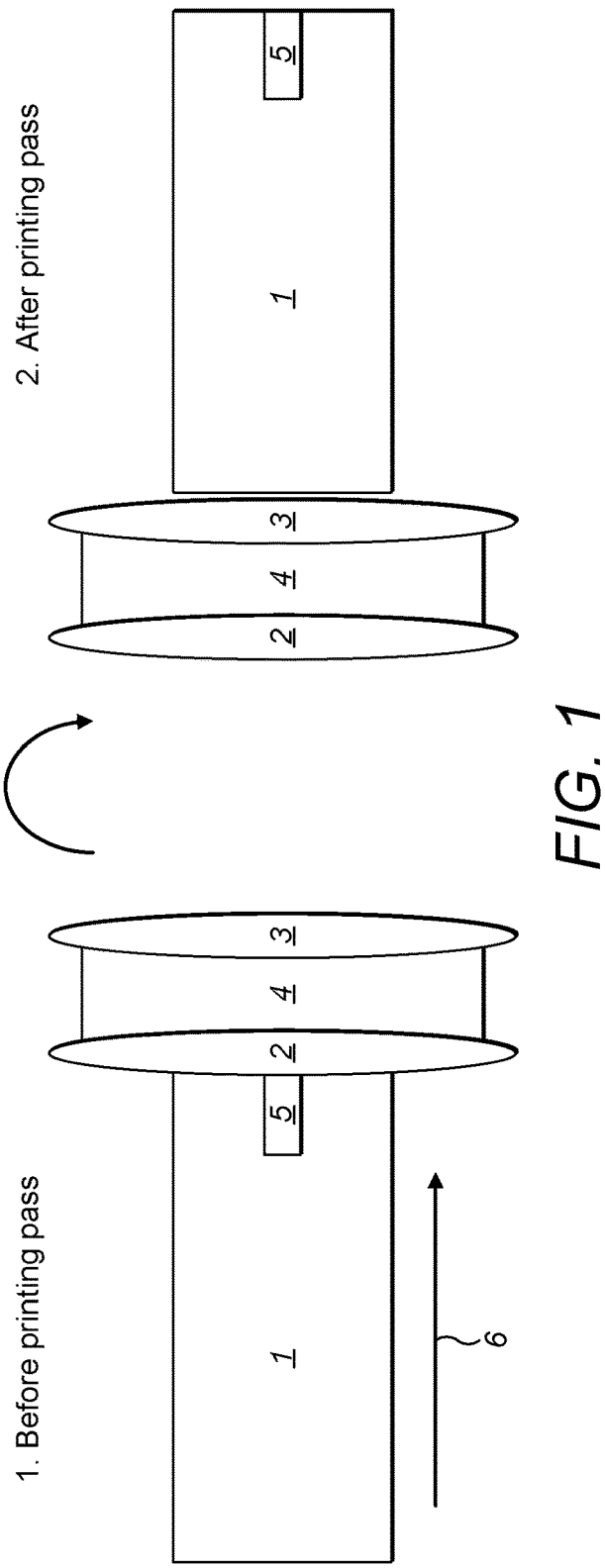
FIG. 1 shows the configuration of lamps and print mode for bi-di printing on an Onset S40i.
Figure 2:
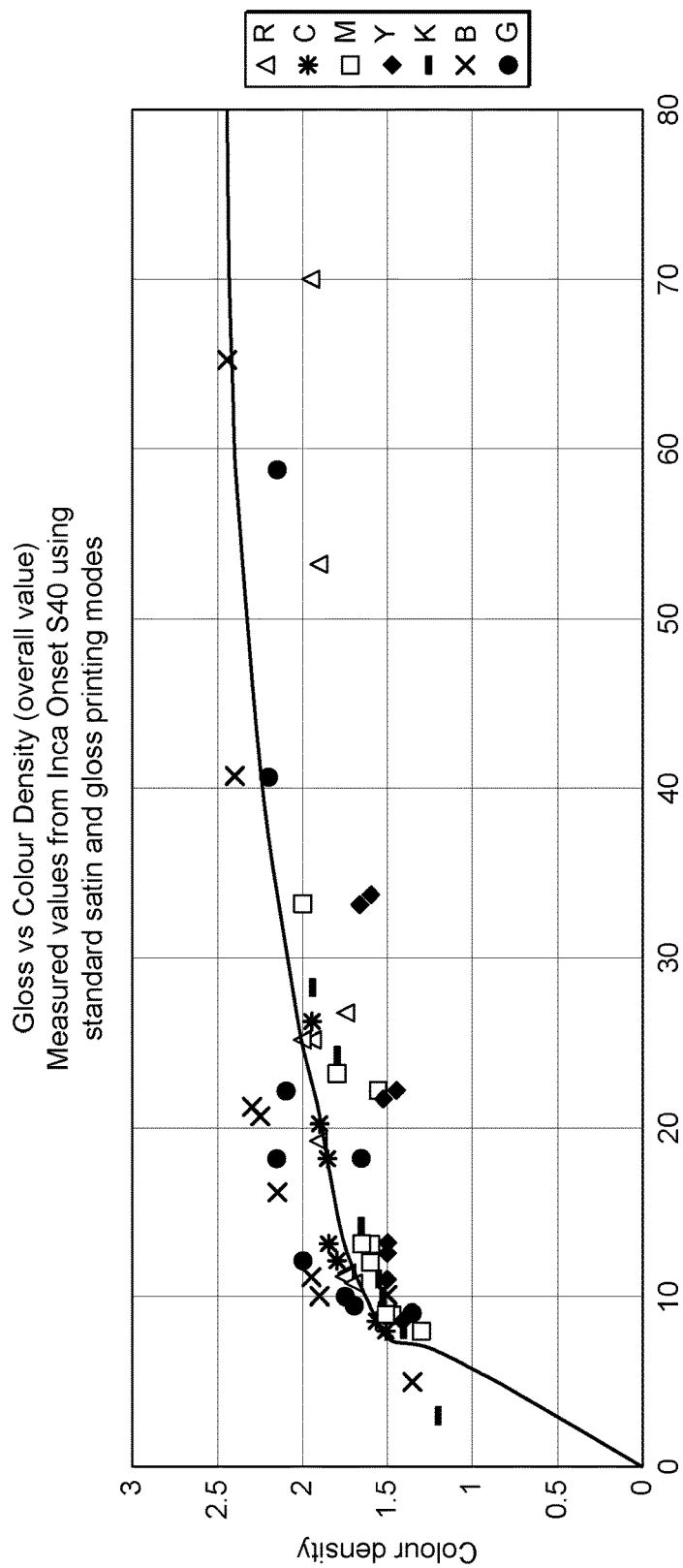
FIG. 2 shows the relationship between gloss and colour density.

An advantage of the present invention is that it allows wide formulation latitude in the ink formulation. Accordingly, the ink may be defined broadly.

The ink of the present invention contains a radiation-curable monomer, preferably the radiation-curable monomer is selected from monofunctional (meth)acrylate monomers, difunctional (meth)acrylate monomers, multifunctional (meth)acrylate monomers, N-vinyl amides, N-(meth)acryloyl amines, α,β-unsaturated ether monomers and combinations thereof.

Monofunctional (meth)acrylate monomers are esters of (meth)acrylic acid and are well known in the art. Examples include a monomer selected from phenoxyethyl acrylate (PEA), cyclic TMP formal acrylate (CTFA), isobornyl acrylate (IBOA), tetrahydrofurfuryl acrylate (THFA), dicyclopentenyl oxyethyl acrylate, 2-(2-ethoxyethoxy)ethyl acrylate, octadecyl acrylate, tridecyl acrylate, isodecyl acrylate (iso-decyl A), lauryl acrylate or combinations thereof. The ink of the invention can include one monofunctional (meth) acrylate monomer or a mixture of two or more monofunctional (meth)acrylate monomers.

The monofunctional (meth)acrylate monomer may have an aliphatic or aromatic cyclic group. The cyclic group may optionally include one or more heteroatoms such as oxygen or nitrogen. Examples include phenoxyethyl acrylate, cyclic TMP formal acrylate, isobornyl acrylate, tetrahydrofurfuryl acrylate, dicyclopentenyl oxyethyl acrylate. Preferred inks according to this embodiment comprise a monofunctional (meth)acrylate monomer that includes an aliphatic or aromatic cyclic group, such as phenoxyethyl acrylate, cyclic TMP formal acrylate, isobornyl acrylate, tetrahydrofurfuryl acrylate, dicyclopentenyl oxyethyl acrylate or combinations thereof. Preferably, the ink comprises a monofunctional meth(acrylate) monomer that includes cyclic TMP formal acrylate, phenoxyethyl acrylate or mixtures thereof.

The ink of the invention preferably comprises 1 to 80% by weight of monofunctional (meth)acrylate monomer, based on the total weight of the ink.

Examples of the multifunctional (meth)acrylate monomers which may be included in the inkjet inks include hexanediol diacrylate (HDDA), decane diol diacrylate (DDDA) trimethylolpropane triacrylate, pentaerythritol triacrylate, polyethylene glycol diacrylate, for example, tetraethylene glycol diacrylate), dipropylene glycol diacrylate (DPGDA), tri(propylene glycol) triacrylate, neopentyl glycol diacrylate, bis(pentaerythritol) hexaacrylate, 3-methyl pentanediol diacrylate (3-MPDA) and the acrylate esters of ethoxylated or propoxylated glycols and polyols, for example, propoxylated neopentyl glycol diacrylate (NPG-PODA), ethoxylated trimethylolpropane triacrylate, and mixtures thereof. Particularly preferred are di- and trifunctional acrylates. Also preferred are those with a molecular weight greater than 200. A preferred example is 3-methyl pentanediol diacrylate.

In addition, suitable multifunctional (meth)acrylate monomers include esters of methacrylic acid (i.e. methacrylates), such as hexanediol dimethacrylate, decane diol methacrylate trimethylolpropane trimethacrylate, triethyleneglycol dimethacrylate, diethyleneglycol dimethacrylate, ethyleneglycol dimethacrylate, 1,4-butanediol dimethacrylate. Mixtures of (meth)acrylates may also be used.

Multifunctional (meth)acrylate monomers may be included in an amount of 1 to 80% by weight based on the total weight of the ink, for example 15 to 50%.

(Meth)acrylate is intended herein to have its standard meaning, i.e. acrylate and/or methacrylate. Mono- and multifunctional are also intended to have their standard meanings, i.e. one and two or more groups, respectively, which take part in the polymerisation reaction on curing.

The ink of the present invention may include one or more N-vinyl amides, N-(meth)acryloyl amines, α,β-unsaturated ether monomers and combinations thereof.

N-Vinyl amides are well-known monomers in the art and a detailed description is therefore not required. N-Vinyl amides have a vinyl group attached to the nitrogen atom of an amide which may be further substituted in an analogous manner to (meth)acrylate monomers. Preferred examples include N-vinyl amides having an aliphatic or aromatic cyclic group. The cyclic group may optionally include one or more heteroatoms such as oxygen or nitrogen. Preferred examples are N-vinyl caprolactam (NVC) and N-vinyl pyrrolidone (NVP). NVC is particularly preferred.

Combinations of NVC with the (meth)acrylate monomers set out hereinabove are particularly preferred.

Similarly, N-acryloyl amines are also well-known in the art. N-Acryloyl amines also have a vinyl group attached to an amide but via the carbonyl carbon atom and again may be further substituted in an analogous manner to (meth)acrylate monomers. Preferred examples include N-acryloyl amines having an aliphatic or aromatic cyclic group. The cyclic group may optionally include one or more heteroatoms such as oxygen or nitrogen. A preferred example is N-acryloyl-morpholine (ACMO).

N-Vinyl amides and/or N-acryloyl amines may be included at 1 to 40% by weight, preferably 5 to 30% by weight, more preferably 8 to 25% by weight based on the total weight of the ink. NVC is particularly preferred.

The inks of the present invention may also contain α,β-unsaturated ether monomers, such as vinyl ethers. These monomers are known in the art and may be used to reduce the viscosity of the ink formulation. Typical vinyl ether monomers which may be used in the inks of the present invention are triethylene glycol divinyl ether, diethylene glycol divinyl ether, 1,4-cyclohexanedimethanol divinyl ether and ethylene glycol monovinyl ether. Mixtures of vinyl ether monomers may be used. Triethylene glycol divinyl ether is preferred.

When present in the ink, α,β-unsaturated ether monomers are preferably provided in an amount of 2 to 20% by weight, more preferably 7 to 15% by weight, based on the total weight of the ink.

It is possible to modify the film properties of the inkjet inks by inclusion of a radiation-curable oligomer or inert resin, such as a thermoplastic acrylic. Said radiation-curable oligomers have a weight-average molecular weight from 500 to 8,000, preferably from 1,000 to 7,000 and most preferably from 2,000 to 6,000. The oligomers are preferably functional (i.e. reactive oligomers), in that they take part in the curing reaction.

Radiation-curable oligomers comprise a backbone, for example a polyester, urethane, epoxy or polyether backbone, and one or more radiation-curable groups. The oligomer preferably comprises a urethane backbone. The polymerisable group can be any group that is capable of polymerising upon exposure to radiation. Preferably the oligomers are (meth)acrylate oligomers.

Oligomers may be included at 1 to 30% by weight, preferably 2 to 20% by weight and more preferably 3 to 15% by weight, based on the total weight of the ink.

The inks may comprise a passive (or "inert") thermoplastic resin. Passive resins are resins which do not enter into the curing process, i.e. the resin is free of functional groups which polymerise under the curing conditions to which the ink is exposed. In other words, resin is not a radiation-curable material. The resin may be selected from epoxy, polyester, vinyl, ketone, nitrocellulose, phenoxy or acrylate resins, or a mixture thereof and is preferably a poly(methyl (meth)acrylate) resin. The resin has a weight-average molecular weight of 10-200 KDa and preferably 30-150 KDa, as determined by GPC with polystyrene standards. The resin is preferably present at 1-5% by weight, based on the total weight of the ink.

The inkjet inks of the present invention dry primarily by curing, i.e. by the polymerisation of the monomers present, as discussed hereinabove, and hence are curable inks. Such inks do not, therefore, require the presence of water or a volatile organic solvent to effect drying of the ink, although the presence of such components may be tolerated. Therefore, the inkjet inks of the present invention are preferably substantially free of water and volatile organic solvents. However, trace amounts of volatile organic solvents present or trace amounts of water inevitably present by absorption from the air may be tolerated in the ink provided they do not adversely affect the cure speed.

The ink of the invention comprises a free radical photoinitiator, such as an alpha-hydroxy ketone, an acyl phosphine oxide, a thioxanthone or an alpha-amino ketone. For example, benzophenone, 1-hydroxycyclohexyl phenyl ketone, 1-[4-(2-hydroxyethoxy)-phenyl]-2-hydroxy-2-methyl-1-propane-1-one, 2-dimethylamino-2-(4-methyl-benzyl)-1-(4-morpholin-4-yl-phenyl)butan-1-one, diphenyl-(2,4,6-trimethylbenzoyle) phosphine oxide, 2-benzyl-2-dimethylamino-(4-morpholinophenyl)butan-1-one, isopropyl thioxanthone, benzil dimethylketal, bis(2,6-dimethylbenzoyl)-2,4,4-trimethylpentylphosphine oxide or mixtures thereof and 2-hydroxy-1-[4-(4-(2-hydroxy-2-methyl-propionyl)phenoxy)phenyl]-2-methylpropan-1-one. Such photoinitiators are known and commercially available such as, for example, under the trade names Irgacure and Darocur (from Ciba) and Lucerin TPO and BAPO (from BASF), and Esacure (from Lamberti). Preferred photoinitiators are selected from bis(2,6-dimethylbenzoyl)-2,4,4-trimethylpentylphosphine oxide, 1-hydroxycyclohexyl phenyl ketone, diphenyl (2,4,6-trimethylbenzoyle) phosphine oxide, and mixtures thereof.

Preferably, the photoinitiator is present in an amount of 1-22% by weight, preferably 5-20% by weight, based on the total weight of the ink.

The printing ink may also contain a colorant. The colorant may be a dye or a pigment. Preferably the colorant is a dispersible pigment, of the types known in the art and commercially available such as under the trade-names Paliotol (available from BASF plc), Cinquasia, Irgalite (both available from Ciba Speciality Chemicals) and Hostaperm (available from Clariant UK). The pigment may be of any desired colour such as, for example, Pigment Yellow 13, Pigment Yellow 83, Pigment Red 9, Pigment Red 184, Pigment Blue 15:3, Pigment Green 7, Pigment Violet 19, Pigment Black 7 and titanium dioxide Pigment White 6. Especially useful are black and the colours required for trichromatic process printing. Mixtures of pigments may be used.

In one aspect the following pigments are preferred. Cyan: phthalocyanine pigments such as Phthalocyanine blue 15.4. Yellow: azo pigments such as Pigment yellow 120, Pigment yellow 150, 180, 185 and 151 and Pigment yellow 155. Magenta: quinacridone pigments, such as Pigment violet 19 or mixed crystal quinacridones such as Cromophtal Jet magenta 2BC and Cinquasia RT-355D. Black: carbon black pigments such as Pigment black 7. White: titanium dioxide pigments such as rutile.

The colorant, typically a dispersed pigment, may be included at 1-30% by weight, preferably 1-20% by weight, based on the total weight of the ink.

Other components of types known in the art may be present in the ink to improve the properties or performance. These components may be, for example, radical inhibitors, surfactants, defoamers, dispersants, synergists for the photoinitiator, stabilisers against deterioration by heat or light, reodorants, flow or slip aids, biocides and identifying tracers.

The inkjet ink of the invention exhibits a desirable low viscosity (200 mPas or less, preferably 100 mPas or less, more preferably 30 mPas or less at 25° C.). Preferably the viscosity of the ink of the invention is between 10 mPas and 30 mPas at 25° C. Viscosity may be measured using a Brookfield viscometer fitted with a thermostatically controlled cup and spindle arrangement, such as a DV1 low-viscosity viscometer running at 20 rpm at 25° C. with spindle 00.

The inks of the invention may be prepared by known methods such as, for example, stirring with a high-speed water-cooled stirrer, or milling on a horizontal or centrifugal bead-mill.

The ink of the present invention is cured by exposing the printed ink to actinic radiation, e.g. UV radiation. For the avoidance of doubt, the monomers and oligomers described herein are therefore radiation-curable monomers and radiation-curable oligomers. The inks described herein may be applied in the form of an inkjet ink set, e.g. CMYK optionally with further colours, including white. In a preferred embodiment of the present invention, multiple colours are printed in each pass. The inks are typically provided in a bottle, but could be provided in a cartridge. A typical cartridge comprises an ink container and an ink delivery port which is suitable for connection with an inkjet printer.

As explained hereinabove, inkjet inks may be printed in a single- or multi-pass mode. The present invention relates to the multi-pass mode described hereinabove. That is, in the method of the present invention, a substrate moves relative to an inkjet printhead having an array of nozzles in a first pass from one end of the substrate to the other, the printhead laying down a portion of the ink required to form the image on the substrate as it passes over the substrate. Further portions are then laid down in subsequent passes of the printhead until the complete image is formed. The printing may be uni- or bi-directional multi-pass printing, and most preferably bi-directional, and the printhead may optionally index left or right relative to the substrate between passes such that individual nozzles track a different portion of the substrate on different passes. In effect, an ink droplet does not land on the location where the previous ink droplet landed (or where is would have landed, but did not land, in the case of a non-firing nozzle).

The total number of passes for each image will depend on the properties of the ink and substrate, and on the requirement for the final image. Typically, the number of passes to make up the final image will be from 2 to 32, more preferably from 4 to 20, and most preferably 4, 8, 10 or 18. The total amount of ink applied to the substrate for each pass will vary depending on the requirements of the final application of the printed image.

The ink is effectively laid down in pairs of layers. The first pair is laid down and then both layers are cured together. This means that every other layer receives a time delay to allow the ink to spread, and the resultant print has a higher gloss and gamut than printing in the traditional manner. The benefit of this compared to traditional methods is an increased gamut and gloss without compromising adhesion and print quality since a good strength cure is applied to the layers throughout the image-building process.

The layers are typically complete layers of ink formed within the print region. That is, within the area of the print region, where ink is laid down, there are no gaps in the layers. However, gaps may inadvertently appear where nozzles are blocked or misfiring. There may also be some instances where it is desirable deliberately to leave gaps in one or more of the individual layers.

The time interval between applying the first and second layers in a pair is 0.05-10 s, more preferably 1-5 s. The time interval between applying the second layer in a pair and exposing the pair of layers to actinic radiation is less than 1 s. This exposure cures the ink to provide a solid film.

Suitable substrates include styrene, paper, board, SAV, PolyCarb (a polycarbonate), PVC and VIVAK (a polyethylene terephthalate glycol modified).

The features of printers that are suitable for printing radiation-curable inkjet inks in a multi-pass mode are well known to the person skilled in the art. Such printers use a pressurised header tank for delivering the ink to the printhead, which allows control of the meniscus position in the nozzle. UV printers usually require heating at the printhead to produce a jettable viscosity of the UV curable inks. In one embodiment, the printing apparatus of the present invention comprises one or more piezo drop on demand printheads. In a preferred embodiment of the invention, the average drop size for inkjet printing is from 1 to 95 pL. Preferably the printheads are capable of jetting ink in drop sizes of from 1 to 75 pL, more preferably 2 to 55 pL, particularly preferably 8 to 45 pL.

The ink of the present invention comprises a radiation-curable component and therefore requires curing of the radiation-curable component upon exposure to actinic radiation. The source of actinic radiation can be any source of actinic radiation that is suitable for curing radiation-curable inks but is preferably a UV source. Suitable UV sources include mercury discharge lamps, fluorescent tubes, light emitting diodes (LEDs), flash lamps and combinations thereof. One or more mercury discharge lamps, fluorescent tubes, or flash lamps may be used as the radiation source. When LEDs are used, these are preferably provided as an array of multiple LEDs.

The source of UV radiation could be situated off-line in a dedicated conveyor UV curing unit, such as the SUVD Svecia UV Dryer. Preferably, however, the source of radiation is situated in-line, which means that the substrate does not have to be removed from the printing apparatus between the heating and curing steps.

In a preferred embodiment, the radiation source is integral with the printhead. Typically, a printhead comprises first and second radiation sources on the upstream and downstream sides of the jetting nozzles (i.e. the leading and trailing edges of the printhead). This arrangement is shown in FIG. 1. In conventional use (not in accordance with the present invention), in the forward direction, the ink is jetted from the nozzles and irradiated with the trailing radiation source, UV lamp 2. In the return direction, the ink is jetted from the nozzles and irradiated with the previously leading, now trailing, radiation source, UV lamp 1. In the present invention, only lamp 1 is switched on so that only every other layer is irradiated, i.e. the source of actinic radiation is at the leading edge of the printhead (a switched-off lamp is not considered to be a source of actinic radiation).

Suitable radiation sources known in the art include a high and medium pressure mercury discharge lamp, an LED including an array of LEDs, a UV fluorescent lamp or a flash lamp.

The present invention will now be described with reference to the following examples, which are not intended to be limiting.

EXAMPLES

Example 1

Inkjet ink sets as set out in Tables 1-3 were prepared by mixing the components in the given amounts. Amounts are provided as weight percentages.

TABLE 1

| | Ink set no. 1. | | | |
|---|---|---|---|---|
| Component | Cyan (wt %) | Magenta (wt %) | Yellow (wt %) | Black (wt %) |
| PEA | 14.20 | 10.53 | 12.58 | 8.00 |
| CTFA | 18.40 | 17.86 | 18.94 | 32.35 |
| IBOA | 11.30 | 10.97 | 10.62 | 10.64 |
| NVC | 15.67 | 18.72 | 19.35 | 17.48 |
| IDA | 4.75 | 4.73 | 4.74 | 0.00 |
| Stabiliser | 0.26 | 0.29 | 0.26 | 0.30 |
| Arcylic resin dispersion | 12.87 | 6.62 | 10.43 | 4.00 |

TABLE 1-continued

Ink set no. 1.

| Component | Cyan (wt %) | Magenta (wt %) | Yellow (wt %) | Black (wt %) |
|---|---|---|---|---|
| Amine-modified acrylate oligomer | 1.90 | 1.89 | 1.90 | 1.90 |
| Cyan dispersion | 6.00 | | | |
| Magenta dispersion | | 13.00 | | |
| Yellow dispersion | | | 8.00 | |
| Black dispersion | | | | 5.30 |
| Irgacure 184 | 1.79 | 1.78 | 2.92 | 2.93 |
| TPO | 7.61 | 7.57 | 7.60 | 7.60 |
| EDB | 0.81 | 1.61 | | 1.52 |
| ITX | 0.76 | 0.76 | 0.76 | 1.52 |
| Benzophenone | 2.73 | 2.72 | | 2.66 |
| Irg379 | | | | 2.85 |
| Stabilising Additive | 0.00 | | 0.95 | |
| PDMS Surfactant | 0.95 | 0.95 | 0.95 | 0.95 |
| Total | 100.00 | 100.00 | 100.00 | 100.00 |

TABLE 2

Ink set no. 2.

| Component | Cyan (wt %) | Magenta (wt %) | Yellow (wt %) | Black (wt %) |
|---|---|---|---|---|
| PEA | 20.00 | 20.00 | 20.00 | 37.57 |
| IBOA | 3.00 | | 1.50 | |
| CTFA | 22.92 | 21.19 | 25.77 | 10.00 |
| DVE-3 | 2.30 | 3.50 | 3.50 | |
| HDDA | 15.00 | 15.00 | 15.00 | 15.00 |
| NVC | 11.30 | 10.68 | 10.68 | 12.00 |
| Stabiliser | 0.26 | 0.26 | 0.26 | 0.26 |
| Urethane acrylate resin | 4.70 | 1.00 | 2.50 | 4.70 |
| Cyan dispersion | 6.00 | | | |
| Magenta dispersion | | 13.00 | | |
| Yellow dispersion | | | 8.00 | |
| Black dispersion | | | | 5.29 |
| Irgacure 184 | 1.88 | 1.88 | 3.08 | 3.08 |
| TPO | 8.01 | 8.01 | 8.01 | 8.00 |
| Benzophenone | 2.88 | 2.88 | | 2.80 |
| ITX | 0.80 | 0.80 | 0.80 | 0.60 |
| EDB | 0.85 | 1.70 | | 0.60 |
| Stabilising Additive | | | 0.80 | |
| PDMS Surfactant | 0.10 | 0.10 | 0.10 | 0.10 |
| Total | 100.00 | 100.00 | 100.00 | 100.00 |

TABLE 3

Ink set no. 3.

| Component | Cyan (wt %) | Magenta (wt %) | Yellow (wt %) | Black (wt %) |
|---|---|---|---|---|
| DPGDA | 31.45 | 25.90 | 29.37 | 30.51 |
| HDDA | 30.23 | 30.00 | 30.00 | 30.00 |
| DVE-3 | 9.43 | 8.00 | 7.36 | 9.62 |
| Stabiliser | 0.80 | 0.30 | 0.30 | 0.30 |
| Urethane acrylate resin 1 | 8.60 | 5.80 | | 7.80 |
| Urethane acrylate resin 2 | 2.15 | 1.45 | | 1.95 |
| Polyester acrylate resin | | | 9.20 | |
| Cyan dispersion | 4.53 | | | |
| Magenta dispersion | | 13.00 | | |
| Yellow dispersion | | | 10.40 | |
| Black dispersion | | | | 5.29 |
| Irgacure 184 | 1.88 | 3.00 | 2.48 | 3.00 |
| Benzophenone | 2.82 | 8.50 | 7.98 | 2.88 |
| TPO | 8.01 | 4.00 | 2.81 | 8.17 |
| PDMS surfactant 1 | 0.10 | 0.05 | 0.10 | |
| PDMS surfactant 2 | | | | 0.48 |
| Total | 100.00 | 100.00 | 100.00 | 100.00 |

Ink sets 2 and 3 inks have a high tendency to spread after jetting giving them high gloss. The ink set 1 has better flexibility, but a lower tendency to spread owing to its faster curing.

Example 2

Images were printed on an Onset S40i bi-directional printer at 120% relative ink density (RID) with ink set 1 and evaluated for colour gamut, density and gloss (60 degrees).

FIG. 1 shows the configuration of the S40i with lamp 1 and lamp 2 clearly labelled. Table 4 provides a description of the print and cure passes used in the print runs. Table 5 provides a summary of the resultant colour gamut and end user properties.

Run 1 is the standard print made using an Onset S40i 8-pass 120% RID using ink set 1 with UV lamps both on at 100%. The resultant print has excellent end user properties, but a small colour gamut compared to ink sets 2 and 3.

Run 2 is another comparative example where both lamps are on but a lower UV power is used for all passes except the final pass, where the UV dose is increased to provide acceptable end user properties. Unfortunately the ink is so reactive that even at the low dose conditions (15%) there has been no improvement in drop spread, gloss and gamut.

Figure 3:
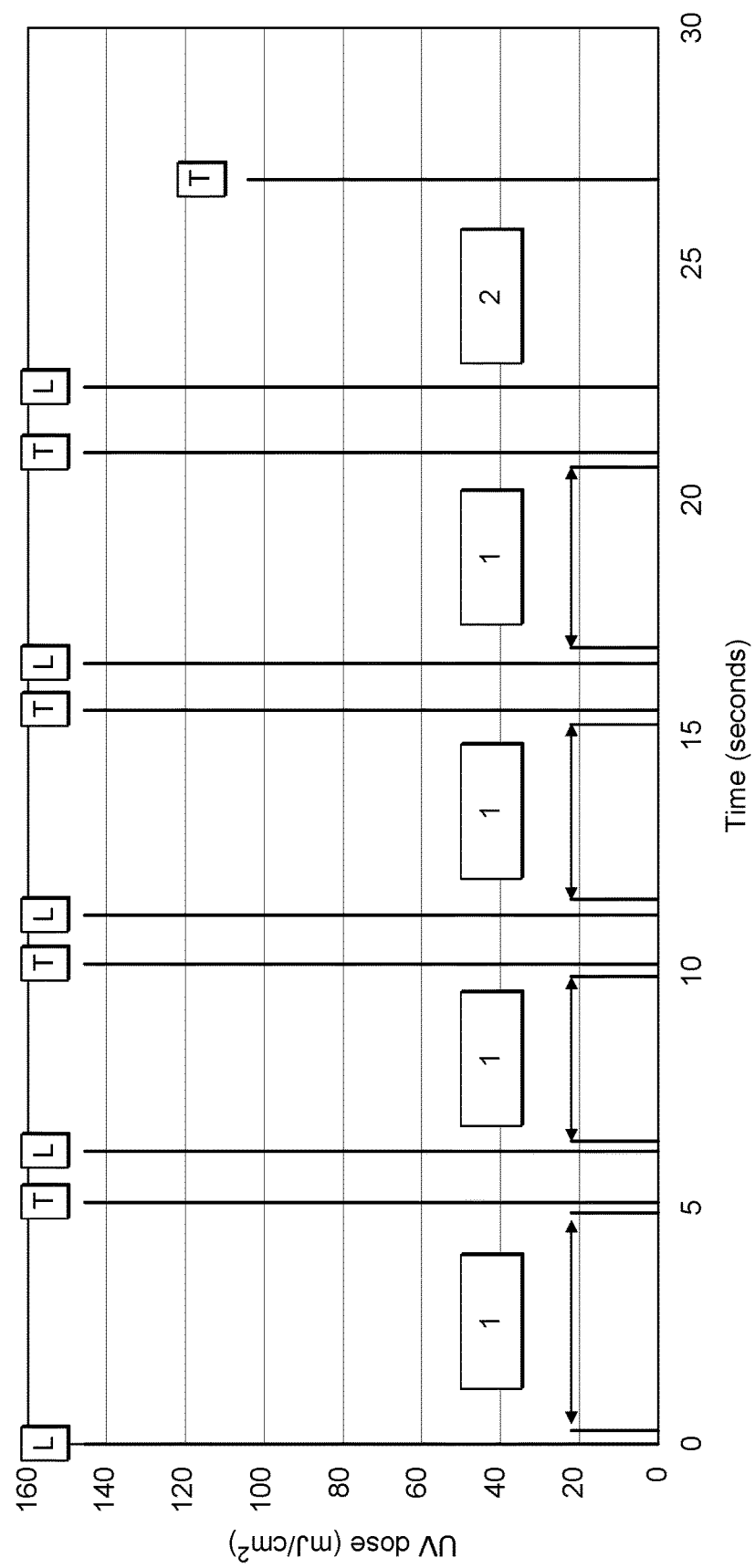
FIG. 3 shows the relationship between print and cure passes for the ink of Run 4.
Figure 4:
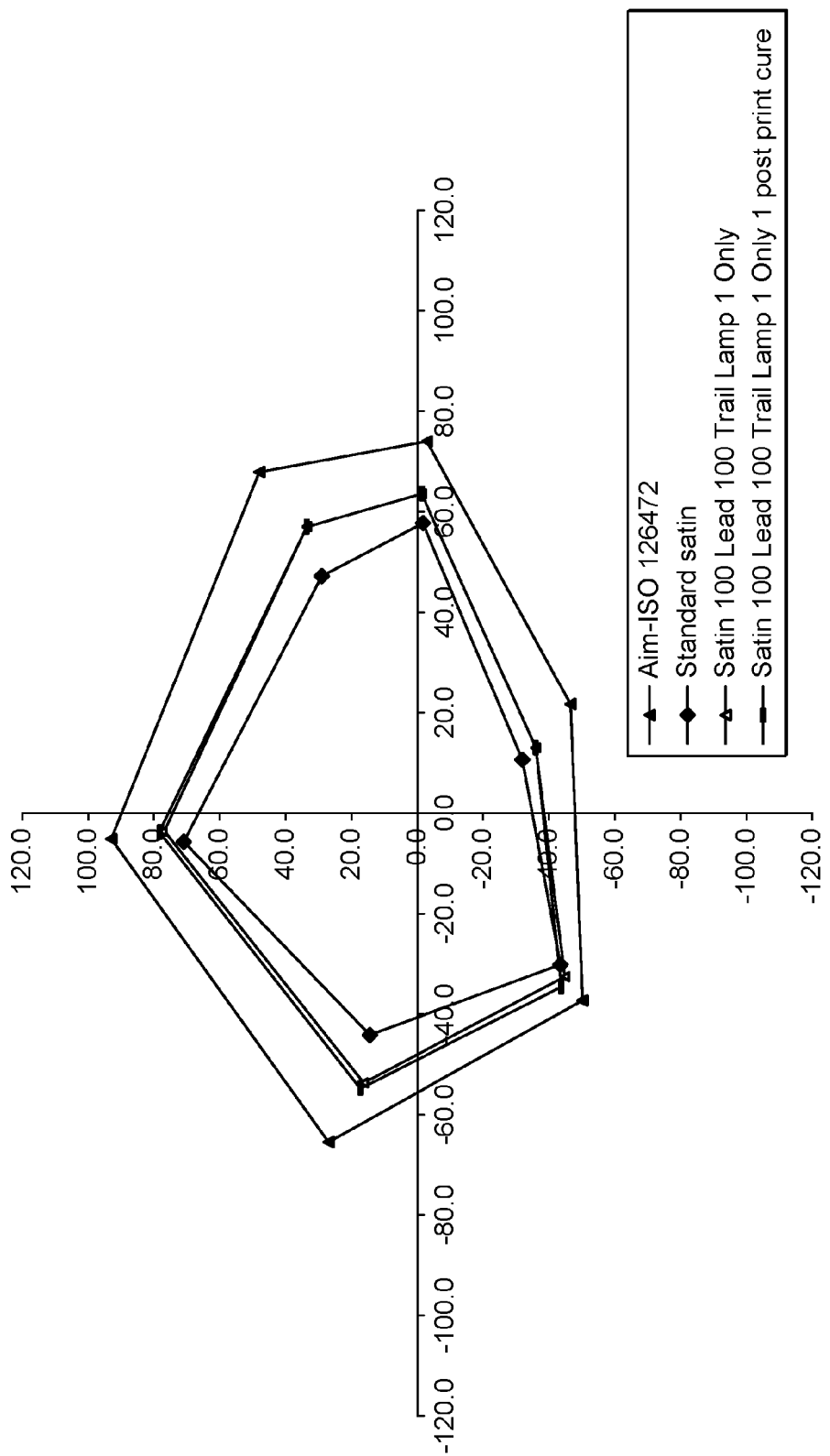
FIG. 4 shows the improvements made to colour gamut using 1 lamp print mode in Runs 3 and 4.
Figure 5:
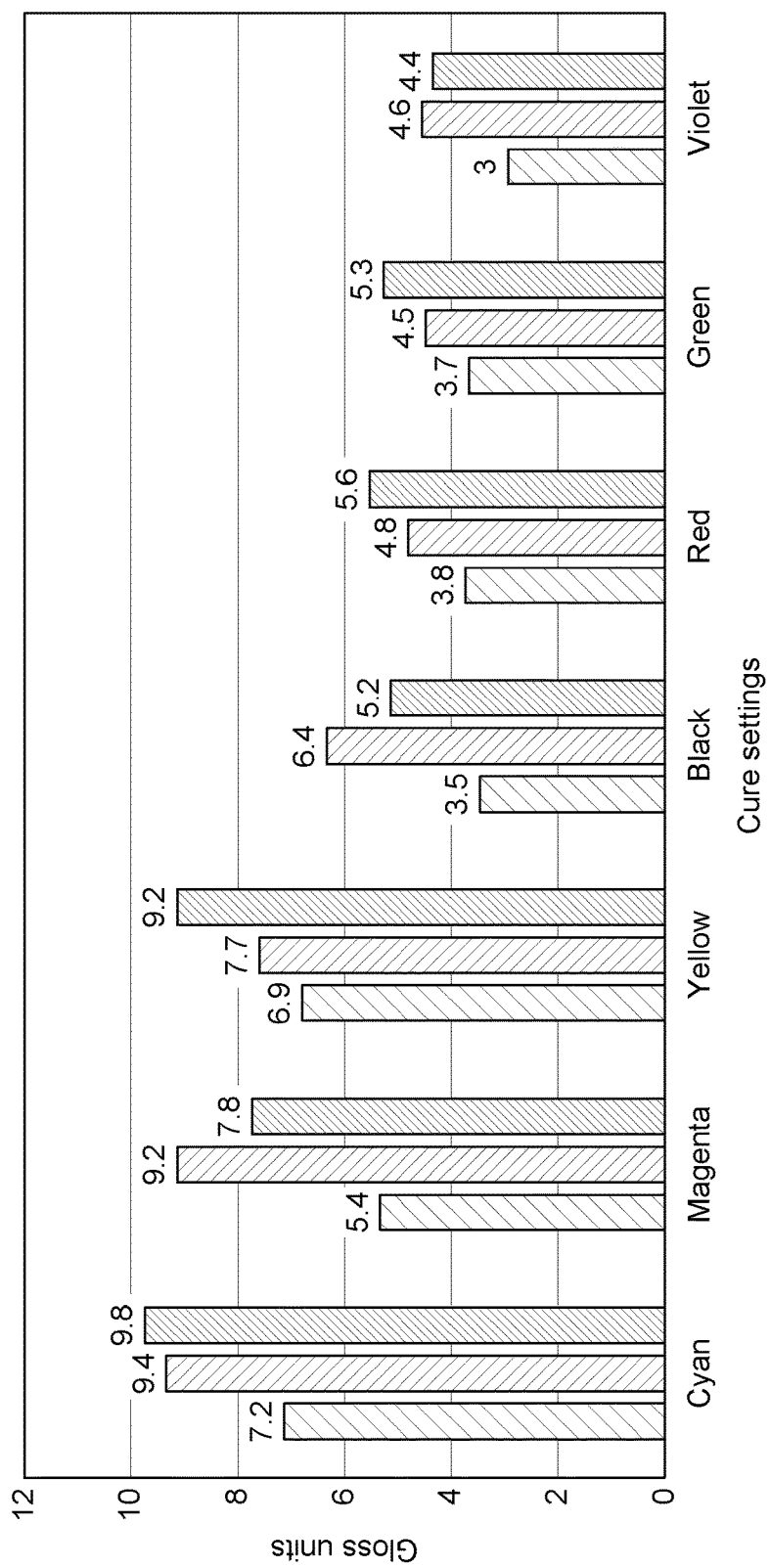
FIG. 5 shows the gloss improvements using 1 lamp curing compared to standard "satin print" mode and a commercial "glossy" ink.

Runs 3-6 employ a 1 lamp mode where every other pass receives delayed cure. In these instances the drop spread gained in every other pass results in an improved colour gamut and gloss with good text bleed. Run 3 shows the effect of having one lamp on during the print process, with no additional cure passes. For some applications this may be suitable, but in this instance, it was desirable to introduce a post-cure pass as shown in Run 4 to improve surface cure and blocking (Table 5). FIG. 3 is the UV power map and illustrates the relationship between print and cure for this example and FIG. 4 shows the improvement to colour gamut using 1 lamp curing with FIG. 5 showing the improvement to gloss. Run 5 illustrates the fact that the lamp selected to be on must correspond with the lamp which is the trailing lamp on the final print pass, or if not, that an additional cure pass(es) is applied.

In FIG. 3, L represents the leading lamp and T represents the trailing lamp. Only lamp 1 is powered. The bars separated by double-headed arrows indicate where printing has taken place. The double-headed arrows represent the time allowed for the ink to spread prior to printing and curing on the return pass. The boxed numeral 1 represents the gap between a printing pass and then the return printing pass before UV curing and the boxed numeral 2 represents the gap between extra cure passes, with no printing in between. In FIG. 5, the left-hand bars are ink set 1 satin, the middle bars are ink set 3 satin and the right-hand bars are ink set 1 according to Run 4 (of the invention).

TABLE 4

Description of print and cure passes for ink set no. 1 tested on Onset S40i

| | | Print pass | | | | | | | | | |
|---|---|---|---|---|---|---|---|---|---|---|---|
| | | 1 | 2 | 3 | 4 | 5 | 6 | 7 | 8 | 9 | 10 |
| | | | | | | Print speed (mm/s) | | | | | |
| | | | | | | 1,591 | | | | | 2,000 |
| Run 1 Satin mode (comparative) | Lamp 1 % power | 100 | 100 | 100 | 100 | 100 | 100 | 100 | 100 | | |
| | Lamp 2 % power | 100 | 100 | 100 | 100 | 100 | 100 | 100 | 100 | | |
| Run 2 (comparative) | Lamp 1 % power | 15 | 15 | 15 | 15 | 15 | 15 | 15 | 100 | | |
| | Lamp 2 % power | 15 | 15 | 15 | 15 | 15 | 15 | 15 | 100 | | |
| Run 3 | Lamp 1 % power | 100 | 100 | 100 | 100 | 100 | 100 | 100 | 100 | | |
| | Lamp 2 % power | 0 | 0 | 0 | 0 | 0 | 0 | 0 | 0 | | |
| Run 4 | Lamp 1 % power | 100 | 100 | 100 | 100 | 100 | 100 | 100 | 100 | 100 | 100 |
| | Lamp 2 % power | 0 | 0 | 0 | 0 | 0 | 0 | 0 | 0 | 0 | 0 |
| Run 5 | Lamp 1 % power | 0 | 0 | 0 | 0 | 0 | 0 | 0 | 0 | | |
| | Lamp 2 % power | 100 | 100 | 100 | 100 | 100 | 100 | 100 | 100 | | |
| Run 6* | Lamp 1 % power | 0 | 0 | 0 | 0 | 0 | 0 | 0 | 0 | 0 | 0 |
| | Lamp 2 % power | 100 | 100 | 100 | 100 | 100 | 100 | 100 | 100 | 100 | 100 |

TABLE 5

Effect of cure configurations on colour gamut and end user properties.

| Run no. | Surface smear | Blocking | Adhesion | Colour gamut |
|---|---|---|---|---|
| 1 (comparative) | Good | Good | Good | Poor |
| 2 (comparative) | Good | Good | Poor | Poor |
| 3 | Poor | Poor | Good | Good |
| 4 | Good | Good | Good | Good |
| 5 | Poor | Poor | Good | Good |
| 6* | Good | Good | Good | Good |

*Expected results

What is claimed is:

1. A method of multi-pass inkjet printing comprising:
   (i) providing an inkjet ink comprising a radiation-curable monomer and a photoinitiator;
   (ii) jetting the ink via a printhead on to a substrate, wherein the ink is applied in multiple passes of the printhead with respect to the substrate, with each pass jetting a portion of ink in a layer on the substrate, with a first layer being jetted directly on to the substrate and subsequent layers being jetted onto the preceding layer, to build an image formed of the multiple layers; and
   (iii) exposing all of the layers of ink to actinic radiation to cure the ink, wherein the order of jetting the layers and curing is that pairs of layers are applied to the substrate without exposing the first layer of the pair to actinic radiation prior to the second layer of the pair of layers being applied, curing the pair of layers simultaneously by exposing the pair of layers to actinic radiation, and repeating until the image is formed.

2. The method as claimed in claim 1, wherein the time interval between applying the first and second layers in a pair is 0.05-10 s.

3. The method as claimed in claim 1, wherein the number of passes is from 2 to 32.

4. The method as claimed in claim 1, wherein the radiation-curable monomer is selected from monofunctional (meth)acrylate monomers, difunctional (meth)acrylate monomers, multifunctional (meth)acrylate monomers, N-vinyl amides, N-(meth)acryloyl amines, α,β-unsaturated ether monomers and combinations thereof.

5. The method as claimed in claim 1, wherein the inkjet ink comprises a radiation-curable oligomer or inert resin.

6. The method as claimed in claim 1, wherein the inkjet ink is free of water and volatile organic solvents.

7. The method as claimed in claim 1, wherein the multi-pass inkjet printing is bi-directional.

8. The method as claimed in claim 1, wherein the printhead has a linear array of inkjet nozzles.

9. The method as claimed in claim 8, wherein the printhead indexes between passes.

10. The method as claimed in claim 1, wherein the printhead has an integral source of actinic radiation.

11. The method as claimed in claim 10, wherein the source of actinic radiation is at the leading edge of the printhead.

12. The method as claimed in claim 1, wherein multiple colours are printed in each pass.

* * * * *